H. McCLURE.
DEMOUNTABLE RIM.
APPLICATION FILED MAR. 1, 1916.

1,273,640.

Patented July 23, 1918.
2 SHEETS—SHEET 1.

Inventor
Roderick McClure

By
Herbert E. Smith
Attorney

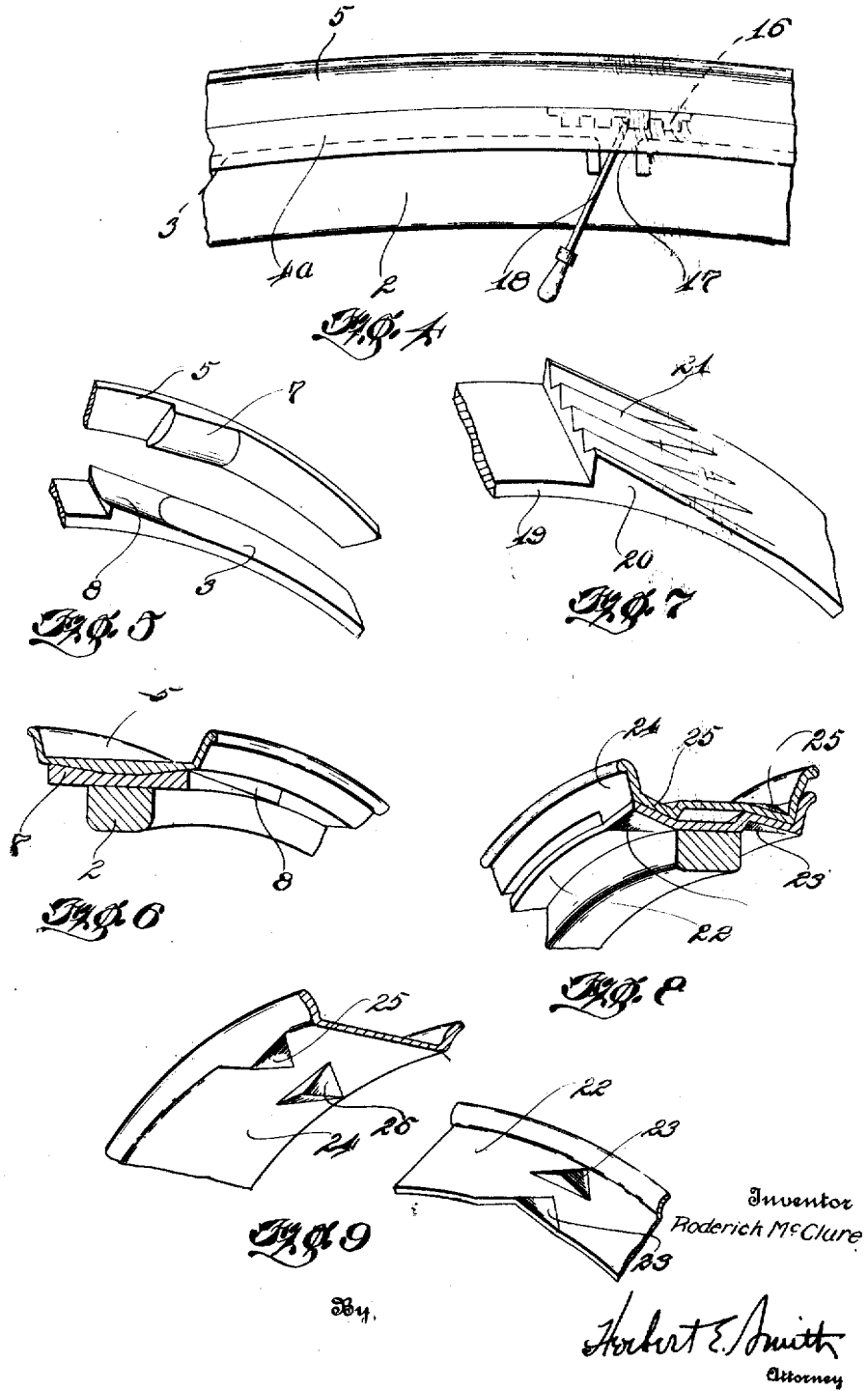

UNITED STATES PATENT OFFICE.

RODERICK McCLURE, OF GILMAN, MONTANA, ASSIGNOR TO HARRY GLEN BARNES, OF GILMAN, MONTANA.

DEMOUNTABLE RIM.

1,273,640.   Specification of Letters Patent.   Patented July 23, 1918.

Application filed March 1, 1916. Serial No. 81,408.

*To all whom it may concern:*

Be it known that I, RODERICK MCCLURE, a citizen of the United States, residing at Gilman, in the county of Lewis and Clark and State of Montana, have invented certain new and useful Improvements in Demountable Rims, of which the following is a specification.

This invention relates to new and useful improvements in demountable rims for automobile wheels and particularly to the type wherein the permanent rim on the felly of the wheel and the demountable rim are provided with interlocking means which are adapted for engagement for operating the demountable rim circumferentially of the permanent rim, and the primary object of the invention is to provide an improved rim of this character which may be quickly and readily removed or adjusted to the wheel when desired.

A further object of the invention resides in providing an improved wedge construction for coöperation between the permanent rim and the demountable rim, and a still further object resides in providing an additional locking means to prevent lateral movement of the demountable rim with respect to the permanent rim and also to prevent a casual disengagement of the aforesaid locking wedge construction.

A further object of the invention resides in providing a rim which is simple and durable in construction, inexpensive to manufacture and one which will be very efficient in use.

With these and other objects in view, my invention consists in the novel features of construction, combination and arrangement of parts, as will be hereinafter referred to and more particularly pointed out in the specification and claim.

In the accompanying drawings, forming a part of this application:—

Fig. 4 is a fragmentary detailed side elevation showing the means for removing or adjusting the rim in position;

Fig. 5 is a detailed perspective view, partly in section showing the wedge construction between the permanent and demountable rims, parts being un-assembled;

Fig. 6 is a perspective view partly in section with the parts assembled and disclosing the wedge construction;

Fig. 7 is a detailed perspective view of a slightly modified form of wedge construction;

Fig. 8 is a perspective view, partly in section, of a further modification of the invention; and Fig. 9 is a perspective view of a permanent rim and demountable rim un-assembled, disclosing the modified form illustrated in Fig. 8.

Figure 1:
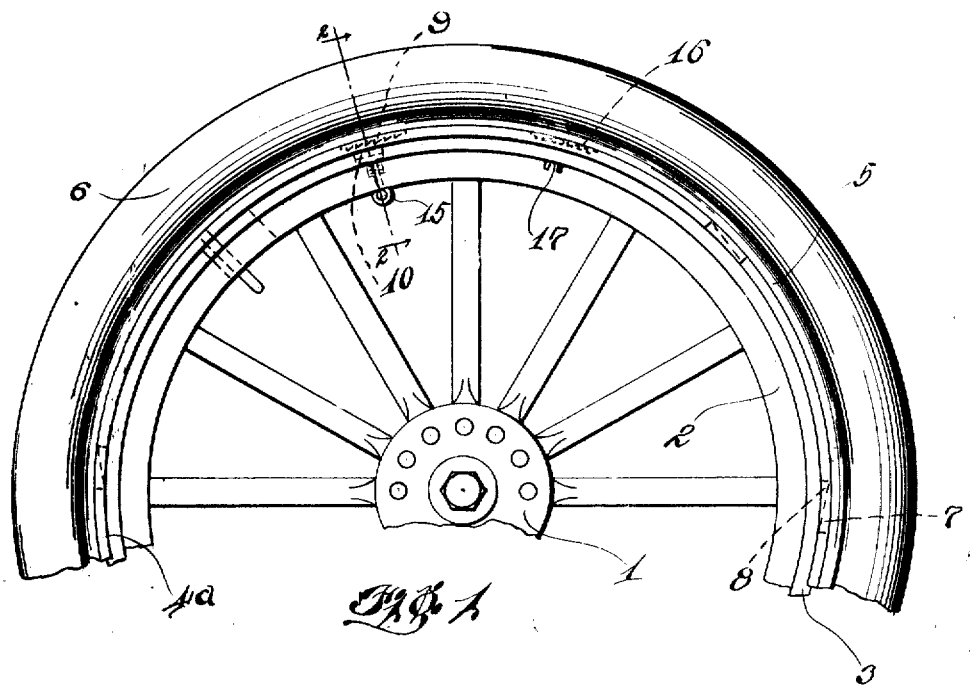
Figure 1 is a fragmentary side elevation of a wheel with a rim thereon, constructed in accordance with my invention.

In describing the invention, I shall refer to the drawings in which similar reference characters designate corresponding parts throughout the several views and in which 1 designates a wheel of the usual or any preferred type used in connection with automobiles or other vehicles, the same being provided with a felly 2 to which is secured the permanent rim 3. This rim, for the purposes of my invention, is preferably provided with an upstanding integral flange 4 along one side edge thereof, as clearly shown in Fig. 2 of the drawing. Adapted to be applied to the rim 3 is the demountable rim 5 to which may be secured in any approved manner, a tire 6.

My invention primarily contemplates the provision of an interlocking means between the demountable and permanent rims which are adapted for their effective engagement by the circumferential movement of the demountable rim on the permanent rim. To this end the inner face of the demountable rim 5 is provided at predetermined points thereon with integral wedge-like projections 7 and the outer face of the permanent rim 3 is correspondingly provided at predetermined points thereon with similar integral wedge-like projections 8 and when these interlocking wedge-like members 7 and 8 are brought into engagement with one another by circumferential movement of the demountable rim, it is obvious that said demountable rim will be securely held in position on the wheel. In the preferred form of the invention, as disclosed in Figs. 5 and 6 of the drawings, the outer face of the wedge-like member 7 is disclosed convex and the face of the wedge-like member 8 is shown concaved. This construction obviously assists in the effective engagement of the wedges.

In order to prevent casual disengagement of the wedges after the same have been interlocked, I provide an additional locking structure for the same. The same consists of a serrated plate 9 secured to the inner face of the rim 5 and a movable block 10 also having a serrated face for engagement with the plate 9. This block 10 is carried by the felly 2 and is adapted to project through an opening 11 in the rim 3. This block is capable of lateral movement in the felly and is held normally outward in engagement with the serrated plate 9 through the medium of a coil spring 12 which encircles a stem 13, carried by the block 10. This stem projects through the felly 2 and is threaded at its outer end as shown at 14 whereby to be engaged by an eye-nut or the like 15. It is obvious that the coil spring 12 tends to normally position the block 10 outwardly in its engaging position with the serrated plate 9, whereby to positively secure the demountable rim in position, but when it is desired to remove said rim from the wheel, the nut 15 may be turned home, whereby to retract the block 10 and disengage the serrated faces. The demountable rim may then be readily disengaged by circumferential movement in the opposite direction.

I have also provided means, whereby to give a circumferential movement to the demountable rim for the purpose of applying or removing said demountable rim. To this end the demountable rim 5 at a predetermined point on its inner face is provided with a plurality of teeth of the like 16 and the rim 3 at the same point is provided with an opening 17. A tire tool or other member 18 may be introduced through the opening 17 to engage the teeth 16 and it is obvious from this construction that the demountable rim may be moved in either direction to positively engage the wedges or disconnect the same, as may be desired.

Figures 2, 3:
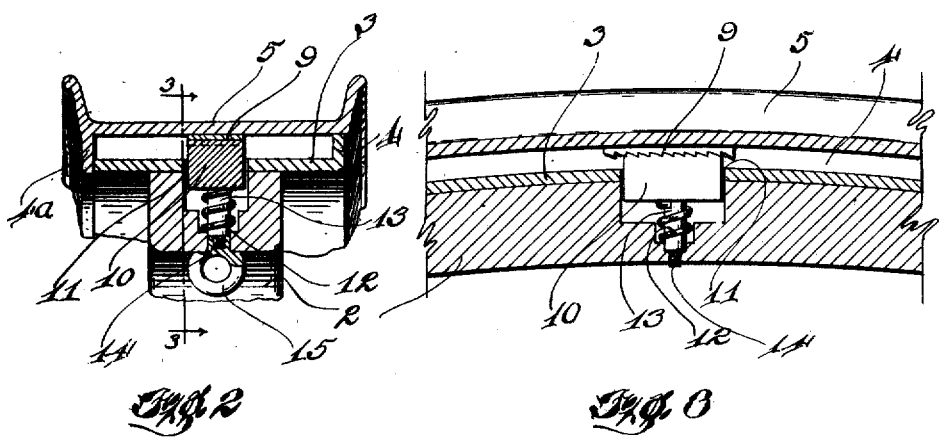
Fig. 2 is a transverse section as seen on the line 2—2 of Fig. 1.
Fig. 3 is a vertical section as seen on the line 3—3 of Fig. 2, the eye-nut being removed.

As stated previously, the rim 3 is provided along its one edge with an upstanding flange 4, the peripheral upper edge of which contacts with the end face of the demountable rim 5 as clearly shown in Fig. 2 of the drawings. The opposite edge of the rim 5 is provided with a depending flange 4ª which is adapted to contact with the opposite peripheral edge of the rim 3, as shown in Fig. 2 of the drawings. Thus this flange 4ª contacts with the edge of the rim 3 and forms a stop for lateral movement of the demountable rim with respect to the permanent rim. Furthermore, these flanges 4 and 4ª act as covering flanges for the openings between the two rims and thus mud, dirt and other extraneous matter is prevented from entering therebetween.

In Fig. 7 I have shown a slightly modified form of the invention wherein a rim 19 is provided with a wedge 20, the face of the wedge being serrated as shown at 21. I have only shown the one rim so constructed, but it is obvious that the opposing rim will be similarly constructed.

In Figs. 8 and 9 I have shown a further modified form of the invention wherein a permanent rim 22 is provided at predetermined points thereon with substantially V-shaped lugs or projections 23. These lugs or projections 23 are formed preferably by up-setting the rim. A demountable rim 24 is provided and has formed integral with its under face similarly designed V-shaped projection or lugs 25 which are designed for interlocking engagement with the projections 23. Otherwise this modified form is the same as the preferred form of the invention and it is obvious from this construction that the rims may be readily interlocked by permitting the lugs 23 and 25 to be brought in frictional contact with one another.

From the foregoing description of the construction of my improved device, the manner of applying the same to use and the operation thereof will be readily understood and it will be seen that I have provided a simple, inexpensive and efficient means for carrying out the objects of the invention.

While I have particularly described the elements best adapted to perform the functions set forth, it is obvious that various changes in the form, proportion and in the minor details of construction may be resorted to, without departing from the spirit or sacrificing any of the principles of the invention.

What I claim and desire to secure by Letters Patent, is:—

The combination with a permanent rim having an opening, and a demountable rim having a serrated plate on its inner side, of a locking device comprising a serrated block seated in the opening and engaging said plate, a stem on the block and a spring coiled about the stem to hold the block in engagement, and said stem having a threaded end to receive a nut for withdrawing the block to inoperative position against the tension of the spring, said fixed rim and demountable rims having elements that are engaged by relative circumferential movement and said locking device adapted to prevent relative movement in the opposite direction.

In testimony whereof I affix my signature.

RODERICK McCLURE.

It is hereby certified that Letters Patent No. 1,273,640, granted July 23, 1918, upon the application of Roderick McClure, of Gilman, Montana, for an improvement in "Demountable Rims," were erroneously issued to Harry Glen Barnes, as owner of the entire interest in said invention, whereas said Letters Patent should have been issued to the inventor, *said McClure and Harry Glen Barnes*, jointly, said Barnes being owner of *one-half* interest, only, as shown by the records of assignments in this office; and that the said Letters Patent should be read with this correction therein that the same may conform to the record of the case in the Patent Office.

Signed and sealed this 27th day of August, A. D., 1918.

[SEAL.]

F. W. H. CLAY,

*Acting Commissioner of Patents.*

Cl.152—21.